United States Patent [19]

Miller, Jr. et al.

[11] 4,156,135

[45] May 22, 1979

[54] ELECTRONIC HETERODYNING IN AN OPTICAL DETECTOR

[75] Inventors: Walter E. Miller, Jr.; Robert R. Mitchell, Huntsville, both of Ala.

[73] Assignee: The United States of America as represented by the Secretary of the Army, Washington, D.C.

[21] Appl. No.: 741,008

[22] Filed: Nov. 11, 1976

[51] Int. Cl.$^2$ .............................................. G02F 2/00
[52] U.S. Cl. ................................... 250/199; 328/144; 328/154
[58] Field of Search .................. 250/199; 358/125; 329/144, 150, 153, 154; 325/449; 343/7.4

[56] References Cited

U.S. PATENT DOCUMENTS

| 3,482,099 | 12/1969 | Goodwin | 250/199 |
| 3,569,996 | 3/1971 | Goell | 250/199 |

FOREIGN PATENT DOCUMENTS 1297922  11/1972  United Kingdom ..................... 250/199

OTHER PUBLICATIONS

Monte Ross, "Laser Receivers" 9-29-66, pp. 108-121 "Photomixing".

Primary Examiner—Robert L. Griffin
Assistant Examiner—Edward L. Coles
Attorney, Agent, or Firm—Nathan Edelberg; Robert P. Gibson; Fred M. Bush

[57] ABSTRACT

An optical detector, being operated in a non-linear portion of its response curve, is used as an electronic heterodyning element for two applied frequencies. They may be applied with two modulated light sources, or one source and an alternating current bias component to provide a preselected sum or difference output signal for selectable input frequencies allowing optical tracking of a target.

5 Claims, 2 Drawing Figures

ELECTRONIC HETERODYNING IN AN OPTICAL DETECTOR

DEDICATORY CLAUSE

The invention described herein may be manufactured, used, and licensed by or for the Government for governmental purposes without payment to us of any royalty thereon.

BACKGROUND OF THE INVENTION

Current discrete high frequency optical tracking systems utilize dc bias and a narrow-band tuned detector signal preamplifier. This improves signal-to-noise ratio and helps prevent amplifier saturation. To counter this system, it is necessary only to transmit to the detector a similar or greater power level of light modulated at the same frequency. Hence, it is desirable to be able to use any of a wide range of modulation frequencies, selected at random, to make possible countermeasures much more difficult. One current method of receiving this greater range of frequencies is to use a wide-band detector preamplifier. With this method, however, noise and saturation are critical problems.

SUMMARY OF THE INVENTION

An optical detector is disposed to receive transmitted or reflected optical energy from a target or moving vehicle. A second signal is applied to the detector, either with the bias supply or with a second modulated light source. The detector is thereby biased or driven to its non-linear region. This allows mixing of the two frequencies to occur in the detector. The second frequency is selected with respect to the first frequency to give a resulting, fixed sum or difference frequency when mixed which can be amplified with a narrow-band amplifier. Thus, electronic heterodyning in the optical detector allows the advantage of increased countermeasure resistance by use of more than one frequency, without the disadvantages of a wide-band detector amplifier.

DESCRIPTION OF THE PREFERRED EMBODIMENT

Figure 1:
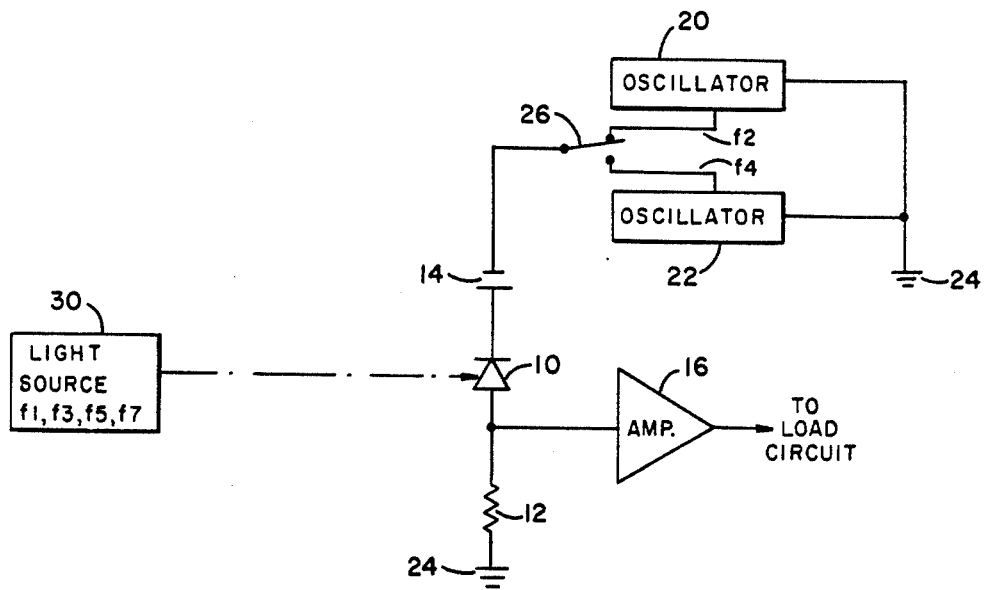
FIG. 1 is a partial block diagram, partial schematic diagram of a preferred embodiment of the invention.

Referring now to the drawings wherein like numbers represent like parts in each figure, FIG. 1 discloses a preferred embodiment wherein an optical detector is disposed for heterodyne operation. A light sensitive semi-conductor device 10 has the anode thereof coupled through a load resistance 12 to ground and the cathode thereof coupled to the positive side of a battery 14. The anode of semi-conductor 10 is further coupled to the input of a tuned, narrow-band detector preamplifier or amplifier circuit 16, the output of amplifier 16 being disposed for providing a predetermined output frequency signal for coupling to other load circuitry such as a recording system monitor or target tracker. Oscillators 20 and 22 are disposed for coupling between the negative terminal of battery 14 and a system ground 24. A switch 26 is disposed between battery 14 and the respective oscillator inputs to selectively provide a path from either oscillator through the switch to ground. Oscillators 20 and 22 are representative of a plurality of oscillators disposed for sequential selection by switch 26 whereby the particular oscillator frequency coupled through battery 14 to semi-conductor 10 is varied by a preselected, established amount. Typically, switch 26 may be a simple manually operated bank of switches or mechanically operated rotary switch, or an electronic switch for selectively or sequentially selecting respective oscillators. A remote light source 30 is disposed for directing optical energy such as from a missile, projectile, or other moving vehicle toward said semi-conductor 10. The light source 30 may be initiated either onboard the moving vehicle or may be reflected from a remotely located light source.

Figure 2:
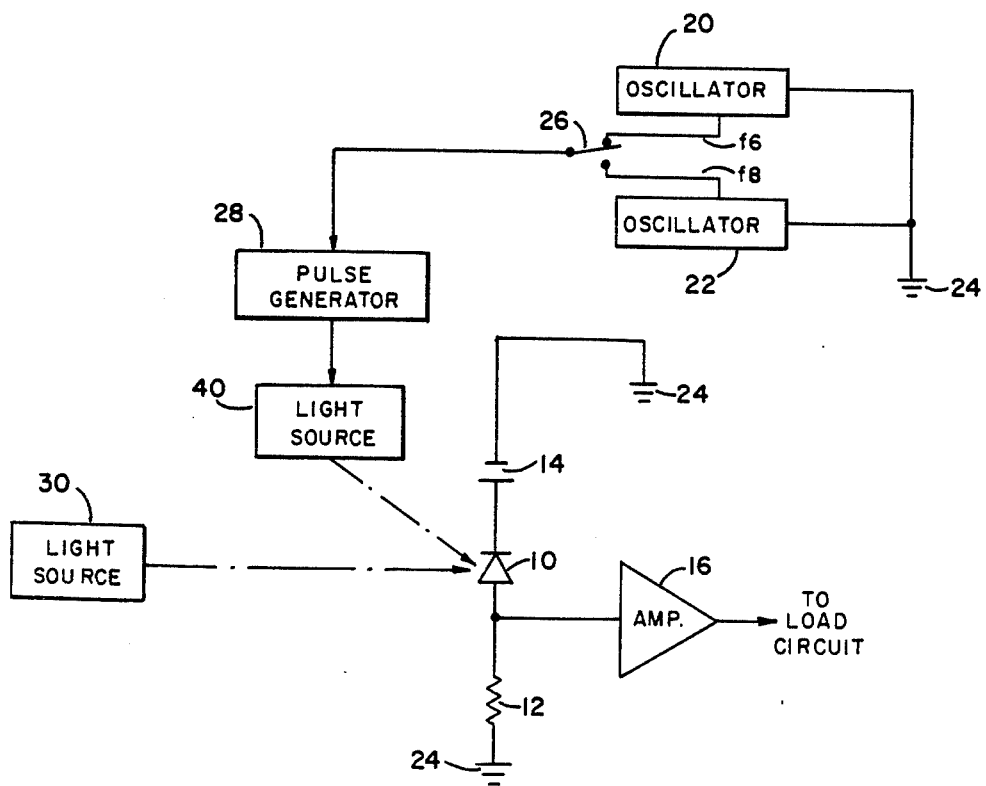
FIG. 2 is a partial block diagram, partial schematic diagram of an alternative embodiment of the invention.

In the alternative embodiment of FIG. 2, the electrical circuit coupled to the semi-conductor optical detector 10 is identical with that of FIG. 1 except for the negative terminal of battery 14 being coupled directly to ground 24. In this embodiment the oscillators 20 and 22 are coupled through switch 26 to a pulse generator 28 which drives a local light emitting source 40. Light source 40 is disposed in close proximity to semi-conductor optical detector 10 for directing signal energy thereto.

In operation, with reference to FIG. 1, the light source 30 emits optical radiation within the wavelength and modulation bandwidths in which the detector 10 is sensitive. Detector 10 is direct current biased into its linear range of operation by bias source 14. An alternating current bias is applied by either oscillator 20 or 22. When the amplitude of the alternating current bias is increased to the point at which the direct current bias is overcome on half of the alternating current cycle, the detector is biased off during that time. Detector 10 is then operating in a non-linear mode and the heterodyne frequencies, as well as each of the applied frequencies, will be present in load resistor 12 and on the input of the narrow-band amplifier 16. The heterodyne frequencies are the sum and difference frequencies of two applied frequencies. The alternating current bias frequency is externally selected by selector switch 26 to coincide with the particular light source 30 modulation, so that one of the heterodyne frequencies (sum or difference) falls within the narrow-band width of the tuned preamplifier 16. Amplifier 16 accepts this sum or difference signal, amplifies it, and couples the output signal to an output load circuit for further processing.

In the embodiment of FIG. 2, a second light source 40 is mounted near the detector 10 and emits the modulation frequency selected by switch 26. The detector 10 is direct current biased by battery 14 for operation in its linear response range until the amplitude of light source 40 is increased to the point at which the detector becomes saturated, or overdriven, on half of each modulation cycle. Detector 10 is then operating in a non-linear mode, and heterodyning can occur in the detector when the frequency from source 30 is also present. Thus if oscillator 20 is selected for providing the modulation signal, the frequency output of oscillator 20 is coupled through switch 26 to drive pulse generator 28. Pulse generator 28 pulses light source 40 at the frequency of oscillator 20 and these optical pulses from light source 40 are detected by detector 10. The modulation frequency of source 40 is chosen by selector switch 26 such that when the particular frequency is received from light source 30 one of the resulting heterodyne frequencies, sum or difference, falls within the bandwidth of a tuned narrow-band amplifier 16. This selection is made based on a prior knowledge of the actual frequency of source 30 for that missile or projectile.

Any one of several frequency choices may be selected to provide the particular oscillator frequency and light source frequency which provides the correct mixing frequency to couple an output signal through amplifier 16. For a vehicle tracking system such as a missile or projectile tracking system, a particular frequency f1, f3, f5, or f7, for example, may be selected for transmission as the light source 30 from the projectile after launch, or this frequency may be reflected from this projectile after launch such that reflection is directed back toward the detector 10. Prior to launch, the particular oscillator frequency f2, f4, f6, or f8 for example is selected to coincide with the particular frequency of light source 30 to provide the desired frequency acceptable by amplifier 16 as the sum or difference output of detector 10. Thus the tuned, narrow-band detector amplifier 16 is tuned to a frequency equal to $f1-f2=f3-f4=f5-f6$ or $=f7-f8$. Or, for example, the frequency may be equal to $f1+f2=f3+f4=f5+f6=f7+f8$. Selection of the correct mixing frequency can be as simple as manually switching switch 26 to the particular oscillator frequency which corresponds or relates to the complimentary frequency of the projectile which is to be launched or having each projectile coded to machanically activate a selector switch when it is disposed in the launching position, allowing automated selection of the appropriate oscillator by direct measurement or selection of the source frequency of the projectile just prior to launch.

A working model of the circuit for providing electronic heterodyning in an optical detector can be constructed utilizing established commercially available components. For example the signal light source 30 and modulating or mixing light source 40 may be a gallium-arsenide light emitting diode such as the General Electric Company model SSL11. The optical detector 10 may be a model SGD-100 manufactured by EG and G Incorporated, and the pulse generator 28 and oscillators 20 and 22 can be provided by a single assembly, the Hewlett Packard pulse generator model HP214A.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An optical detector heterodyning circuit comprising: a semi-conductor optical detector, a load resistance anode coupled between said optical detector and ground, a direct current power supply having one terminal coupled to the cathode of said semi-conductor optical detector and the other terminal coupled to ground, a tuned, narrow-band amplifier having the input coupled to said semi-conductor detector anode and having the output disposed to provide an output signal, and first and second frequency generating means disposed for mixing in said semi-conductor optical detector; said first frequency generating means being a remotely located light source for directing a selectable predetermined frequency of optical energy toward said optical detector; and said second frequency generating means being a plurality of oscillators and a selector switch, said oscillators being coupled to said selector switch for selectively passing predetermined oscillator frequencies therethrough, a pulse generator and a second light source coupled in series, said pulse generator being coupled to said selector switch and being responsive to said oscillator frequencies passing therethrough to provide output pulses of energy for stimulating said second light source to emission; and said second means being disposed adjacent said optical detector.

2. An optical detector heterodyning circuit as set forth in claim 1 wherein said predetermined oscillator frequencies are selectable to coincide with the particular predetermined frequency of said remotely located light source for providing the desired frequency of said tuned, narrow-band amplifier.

3. An optical detector heterodyning circuit comprising: a semiconductor optical detector, a load resistance anode coupled between said optical detector and ground, a direct current power supply having one terminal coupled to the cathode of said semiconductor optical detector, a tuned, narrow-band amplifier having the input directly connected to said semiconductor detector anode and having the output disposed to provide an output signal, and first and second frequency generating means disposed for mixing in said semiconductor optical detector; said first frequency generating means being a remotely located light source for directing a selectable predetermined frequency of optical energy toward said optical detector; and said second means being coupled between the other terminal of said power supply and ground, said second means being a plurality of oscillators and a selector switch, said oscillators being coupled to terminals of said selector switch for selectively coupling predetermined oscillator frequencies through said selector switch, said selector switch being further coupled to the negative side of said direct current power supply for applying said oscillator signals thereto.

4. An optical detector heterodyning circuit as set forth in claim 3 wherein said plurality of oscillators are first and second oscillators for providing first and second oscillator frequency outputs respectively.

5. An optical detector heterodyning circuit as set forth in claim 3 wherein said predetermined oscillator frequencies are selectable to coincide with the particular predetermined frequency of said remotely located light source for providing the desired frequency of said tuned, narrow-band amplifier.

* * * * *